(No Model.) J. ZAKOVEC. 3 Sheets—Sheet 2.
CORN PLANTER.
No. 597,599. Patented Jan. 18, 1898.
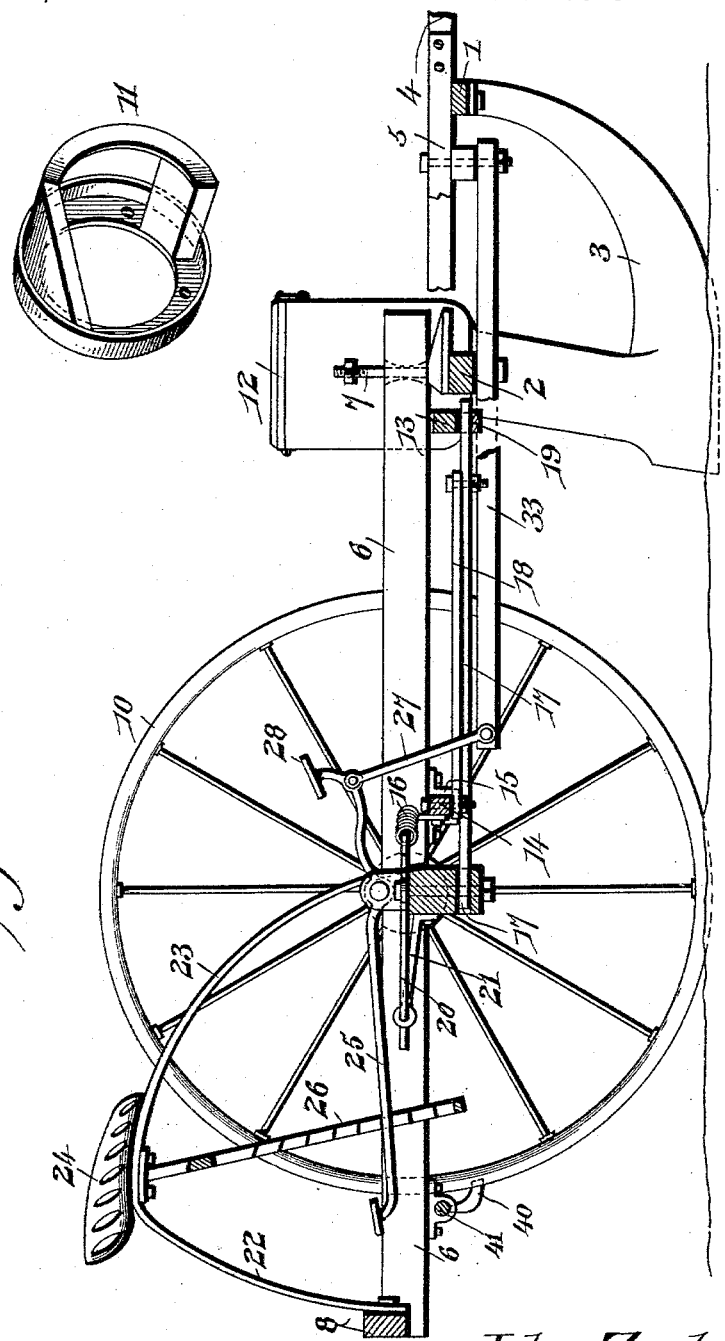
Witnesses
Jas. H. McCathran
V. B. Hillyard.
Inventor
John Zakovec
By his Attorneys,
C. A. Snow & Co.

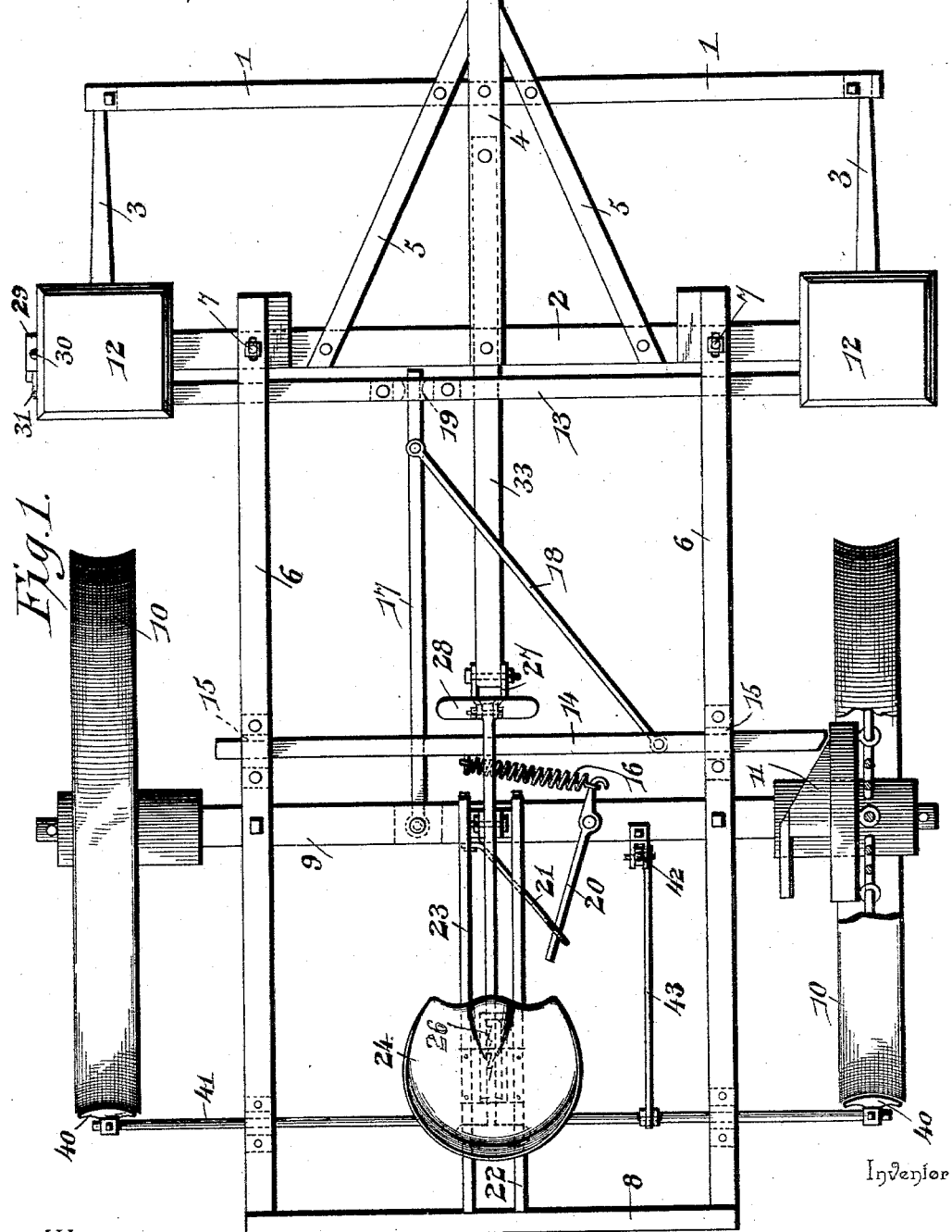

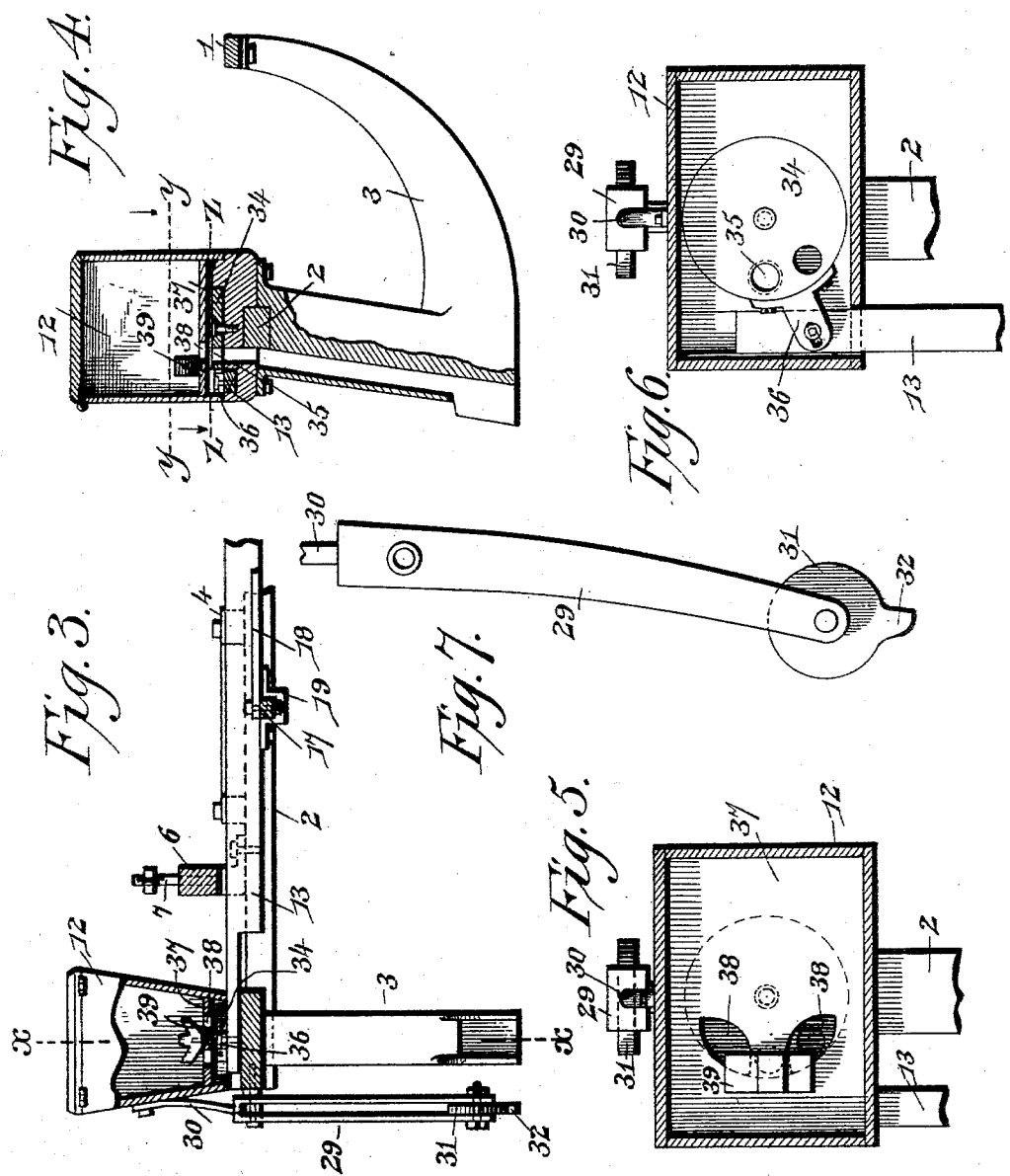

UNITED STATES PATENT OFFICE.

JOHN ZAKOVEC, OF MORSE BLUFF, NEBRASKA.

CORN-PLANTER.

SPECIFICATION forming part of Letters Patent No. 597,599, dated January 18, 1898.

Application filed May 13, 1897. Serial No. 636,385. (No model.)

*To all whom it may concern:*

Be it known that I, JOHN ZAKOVEC, a citizen of the United States, residing at Morse Bluff, in the county of Saunders and State of Nebraska, have invented a new and useful Corn-Planter, of which the following is a specification.

This invention relates to that class of agricultural machinery for sowing seed in check-rows without the intervention of the ordinary check-line and which embody in their construction means for indicating the hills, whereby the machine can be alined so as to plant the seed in straight rows, whereby the check effect is attained.

The improvement relates more particularly to the general construction of the machine, whereby the working parts are reduced to a minimum number and the work performed expeditiously, thoroughly, and in a satisfactory manner, the parts being combined so as to prevent derangement, enable access being readily had thereto, and so as to secure durability, which is a desideratum in machines of this character.

Other objects and advantages are contemplated and will appear as the nature of the invention is better understood, and to this end reference is to be had to the accompanying drawings and the following description, in which corresponding and like parts are indicated and referred to by the same reference-characters.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a top plan view of a planter constructed in accordance with the principles of this invention. Fig. 2 is a longitudinal section. Fig. 3 is a detail view of an end portion of the runner-frame as seen from the rear, parts being broken away. Fig. 4 is a vertical section on the line X X of Fig. 3. Fig. 5 is a plan section on the line Y Y of Fig. 4. Fig. 6 is a plan section on the line Z Z of Fig. 4. Fig. 7 is a detail view in elevation of the marker. Fig. 8 is a detail view of the operating-cam.

The runner-frame consists of transverse bars 1 and 2 and runners 3. The pole or tongue 4 is attached to the bars 1 and 2 and is strengthened by hounds 5, which are secured to the said bars 1 and 2, the parts being joined in any substantial manner.

The wheel-frame is of rectangular shape and comprises longitudinal bars 6 and a rear bar 8, connected together in any manner found most convenient. An axle 9 is located intermediate of the ends of the wheel-frame and is provided with spindles, upon which are mounted ground-wheels 10, one of which serves as a means for operating the seed-dropping mechanism, and for this purpose is provided on its inner side with a cam 11, formed with or applied thereto.

The wheel-frame has loose connection with the cross-bar 2 of the runner-frame in any of the usual ways provided in machines of this character, whereby the two frames are adapted to flex to conform to the surface of the ground when drawn thereover, and, as shown, pins 7, projecting from the bar 2, pass through openings in the front ends of the bars 6 and operate loosely therein. The hoppers or seed-boxes 12 are mounted upon the end portions of the bar 2 and contain seed-dropping mechanism of desired make and pattern and which is actuated when the planter is in operation by means of a reciprocating bar 13, having its terminal portions extending therein, said bar 13 being reciprocated, by means of the cam 11, through the intervening mechanism now to be described.

A bar 14 extends transversely of the wheel-frame and is slidingly mounted in guides 15, secured to the longitudinal bars 6, and one end of the bar 14 extends within the path of the cam 11 to be engaged thereby and by means of which the bar 14 is moved in one direction. A spring 16 moves the bar 14 in an opposite direction and in conjunction with the cam 11 imparts a reciprocating movement thereto which is transmitted to the bar 13 by means of rods or bars 17 and 18. The bar 17 has pivotal connection at its rear end with the axle 9, and its front end operates through a keeper or casting 19, secured to the reciprocating bar 13, and the bar 18 has pivotal connection at its ends with the bars 14 and 17. One end of the spring 16 is secured to the bar 14, and its opposite end is fastened to an arm 20, secured to the axle 9 and strengthened by a brace 21.

Seat-standards 22 and 23 are secured, respectively, to the rear bar 8 and axle 9 and incline upwardly and have the seat 24 attached thereto. A lever 25 is fulcrumed to the axle 9, and its long arm extends rearwardly and is adapted to engage with a notched bar 26, whereby it is held in an adjusted position, and its short arm is connected by means of a link 27 with the inner end of a bar 33, secured to the pole or tongue 4 and projecting in the rear of the bar 2, whereby upon operating the said lever 25 the runner-frame and runners can be raised and lowered in the ordinary manner. A foot-rest 28 is connected with the lever 25 and is accessible from the driver's seat to supplement the action of the power applied to the lever 25, so as to effect the desired adjustment of the runner-frame.

The marker consists of a frame 29, secured to one of the runners by means of a bracket 30 and an indicating-wheel 31, journaled in the lower end of the frame 29, said wheel being provided at a point in its circumference with an extension 32 for depressing the ground and marking the place where the seed is planted, thereby enabling the machine to be alined for dropping the seed in check-rows.

The bottom of the hopper has a discharge-opening registering with a grain-passage of the runner-standard, and a seed-plate 34, operating thereover, has openings 35 to alternately register with the said discharge-opening, and has a lug 36, secured to its edge, with which the rod or bar 13 makes pivotal connection. A false bottom 37 is located over the seed-plate and has openings 38, which are separated by a winged block 39, located directly above the discharge-opening in the bottom of the hopper and which prevents the crowding of the grain into the openings 38.

The ground-wheels are kept clean and free from earth and trash by means of scrapers 40, secured to the ends of a transverse bar 41, operated by means of a lever 42, within convenient reach of the driver's seat and connected with the bar 41 by means of a rod 43. A backward pull upon the upper end of the lever 42 advances the scraper-blades 40 against the ground-wheels 10, and a forward push thereon moves the scraper-blades away from the ground-wheels, as will be readily understood.

Having thus described the invention, what is claimed as new is—

1. In a planter, the combination of a transversely-disposed reciprocating bar having direct connection with the seed-dropping mechanism for actuating it, a second bar extending transversely of the machine parallel with the first-mentioned reciprocating bar and slidably mounted, a bar pivoted at one end and loosely connected with the aforesaid parallel bars, and a ground-wheel provided with a cam for effecting a longitudinal movement of the slidably-mounted bar, substantially as set forth.

2. In a planter, the combination of a transversely-disposed reciprocating bar having direct connection with the seed-dropping mechanism for actuating it, a second bar extending transversely of the machine parallel with the first-mentioned reciprocating bar and slidably mounted, a bar pivoted at one end and loosely connected with the aforesaid parallel bars, a spring having connection with the said second bar for moving it longitudinally in one direction, and a ground-wheel provided with a cam adapted to act in opposition to the said spring for moving the said second bar in opposition to the spring, whereby the spring and cam act jointly to effect a reciprocating movement of the aforesaid bars, substantially as set forth.

3. In a planter, the combination of a transversely-disposed reciprocating bar having direct connection with the seed-dropping mechanism for actuating it, a second bar extending transversely of the machine parallel with the first-mentioned reciprocating bar and slidably mounted, a bar pivoted at one end and loosely connected with the aforesaid parallel bars, a spring having connection with the said second bar for moving it longitudinally in one direction, an arm secured to the framework of the planter and having the opposite end of the spring attached thereto, a bar connecting the said second bar with the first-mentioned reciprocating bar, and a ground-wheel provided with a cam for moving the said second bar in opposition to the spring, substantially as and for the purpose described.

In testimony that I claim the foregoing as my own I have hereto affixed my signature in the presence of two witnesses.

JOHN ZAKOVEC.

Witnesses:
F. C. KAVAN,
ED RANK.